United States Patent [19]
Weghaupt

[11] 3,955,111
[45] May 4, 1976

[54] DEVICE FOR COOLING EXCITATION-CURRENT SUPPLY LINES IN LIQUID-COOLED TURBOGENERATOR ROTORS

[75] Inventor: Erich Weghaupt, Mulheim, Germany

[73] Assignee: Kraftwerk Union Aktiengesellschaft, Mulheim, Germany

[22] Filed: Sept. 9, 1974

[21] Appl. No.: 504,279

[30] Foreign Application Priority Data
Sept. 17, 1973 Germany............................ 2346639

[52] U.S. Cl..................................... 310/54; 310/61; 310/64
[51] Int. Cl.² ......................................... H02K 9/19
[58] Field of Search ............................. 310/52–65, 310/68 R

[56] References Cited
UNITED STATES PATENTS
3,457,440 7/1969 Horsley................................. 310/52
3,733,502 5/1973 Curtis et al. ......................... 310/61

Primary Examiner—Donovan F. Duggan
Attorney, Agent, or Firm—Herbert L. Lerner

[57] ABSTRACT

Device for cooling excitation-current supply lines in a shaft connected at one end thereof to a liquid-cooled turbogeneration rotor having coil windings mounted thereon, the excitation-current supply lines being disposed in bifilar fashion within a bore formed along the axis of the shaft, includes coolant supply and discharge channels for the coil windings extending in the shaft coaxially to the excitation supply lines, the coolant supply and discharge channels being subdivided into a multiplicity of individual sub-channels extending in the shaft at minimal spacing from the axial bore for the excitation-current supply lines, and a coolant collecting chamber surrounding the rotor shaft, the sub-channels terminating through radial bores with the coolant collecting chamber at the rotor end of the shaft.

7 Claims, 4 Drawing Figures

DEVICE FOR COOLING EXCITATION-CURRENT SUPPLY LINES IN LIQUID-COOLED TURBOGENERATOR ROTORS

The invention relates to a device for cooling excitation-current supply lines in liquid-cooled turbogenerator rotors and, more particularly, to such a device wherein the excitation-current supply lines are disposed in bifilar fashion along the axis of the turbogenerator shaft, and discharge channels for the rotor winding extending in the shaft coaxially to the excitation-coil supply lines. A cooling device of the foregoing type has become known heretofore from German Published, Non-prosecuted Application DAS 1,613,341 wherein there are disclosed excitation-current supply lines that are cooled with a liquid flowing directly through coaxial channels in the supply lines. The liquid is conducted parallel to the coolant for the rotor winding of the generator which flows in separated channels. Such direct cooling of the excitation-current supply line has a high efficiency, indeed, yet requires, especially for high-power machines, considerable construction costs, and in fact especially within the exciter coupling. This coupling must have releasable current contacts, connections for the coolant supply and discharge lines, hydrogen and coolant seals, coolant connections to the excitation-current supply lines and coupling bolts, which leads to a concentration of many components in a very narrow space. The constructional measures required for operatively reliable installation thereof are very intricate and can have a disadvantageous effect upon the operational reliability of the turbogenerator.

It is an object of the invention to provide a device for cooling excitation-current supply lines in liquid-cooled turbogenerator rotors which produces indirect cooling of the excitation-current supply lines and which affords considerably lower technical costs, yet is operatively more reliable and simultaneously assures adequate cooling of the excitation-current supply lines.

With the foregoing and other objects in view, there is provided, in accordance with the invention, a device for cooling excitation-current supply lines in a shaft connected at one end thereof to a liquid-cooled turbogeneration rotor having coil windings mounted thereon, the excitation-current supply lines being disposed in bifilar fashion within a bore formed along the axis of the shaft, includes coolant supply and discharge channels for the coil windings extending in the shaft coaxially to the excitation supply lines, the coolant supply and discharge channels being subdivided into a multiplicity of individual sub-channels extending in the shaft at minimal spacing from the axial bore for the excitation-current supply lines, and a coolant collecting chamber surrounding the rotor shaft, the sub-channels terminating through radial bores with the coolant collecting chamber at the rotor end of the shaft.

Through this division of the coolant flow in the shaft at the exciter end thereof into a multiplicity of individual coolant paths which quite closely surround the excitation-current supply lines as a veritable grid or grating, reliable cooling of the excitation-current supply lines is assured under all operating conditions.

Other features which are considered as characteristic for the invention are set forth in the appended claims.

Although the invention is illustrated and described herein as device for cooling excitation-current supply lines in liquid-cooled turbogenerator rotors, it is nevertheless not intended to be limited to the details shown, since various modifications and structural changes may be made therein without departing from the spirit of the invention and within the scope and range of equivalents of the claims.

The invention, however, together with additional objects and advantages thereof will be best understood from the following description when read in connection with the accompanying drawing, in which.

Figure 1:
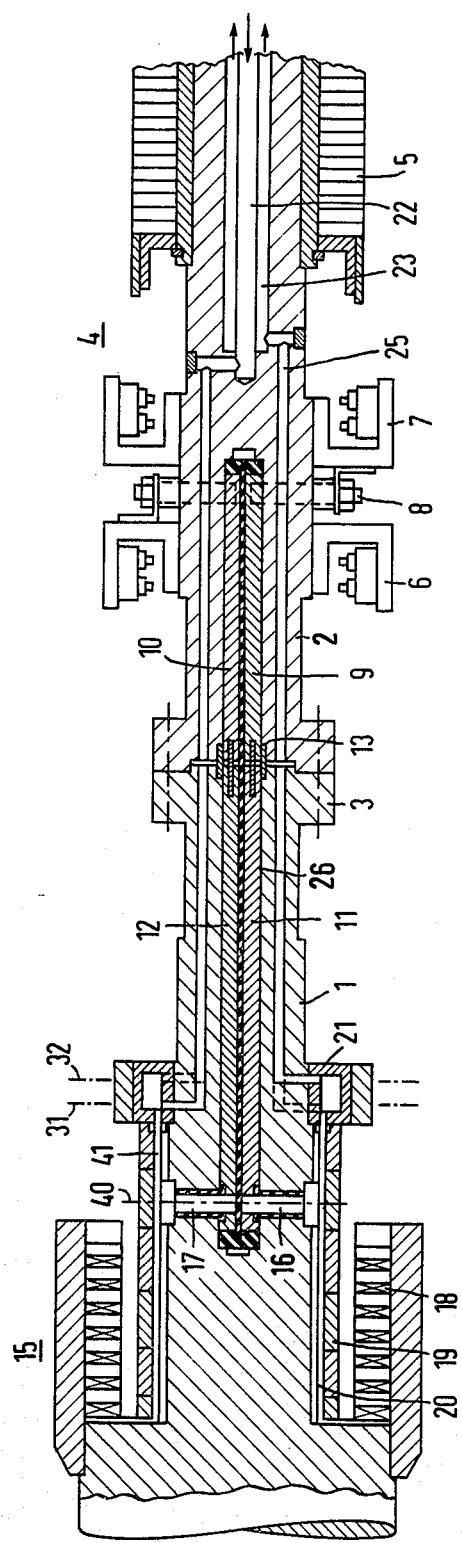
FIG. 1 is a fragmentary longitudinal sectional view of the shaft of a turbogenerator in the region of the excitation-current supply lines and the axial coolant channels.

Referring now to the drawings, and first particularly to FIG. 1 thereof, there is shown a longitudinal sectional view of the exciter end of a shaft of a turbogenerator which includes a rotor shaft section 1 and an exciter shaft section 2. Both shaft sections 1 and 2 are mutually connected mechanically electrically and hydraulically by a coupling 3. A stationary field type or non-slipring excitation system 4 located on the shaft section 2 is formed of a main exciter armature 5 that is connected to an auxiliary excitation machine not further illustrated in FIG. 1, as well as to a pair of diode wheels 6 and 7. The latter are electrically connected through radial contact bolts 8 to excitation-current supply lines 9 and 10 that are disposed in bifilar fashion in the shaft section 2. The excitation-current supply lines 9 and 10 of the shaft section 2 are connected in the coupling 3 to excitation-current supply lines 11 and 12 located in the rotor shaft section 1 through disconnectible of releasable socket or plug contacts 13. At the ends of the excitation-current supply lines 11 and 12 in the rotor 15 proper, radial contact bolts 16 and 17 connect the excitation-current supply lines 11 and 12 to current conductors 20 leading to the exciter winding 18 proper and installed on the shaft surface 19. The exciter winding 18 is supplied with cooling water from a coolant collecting chamber 21.

Figure 3:
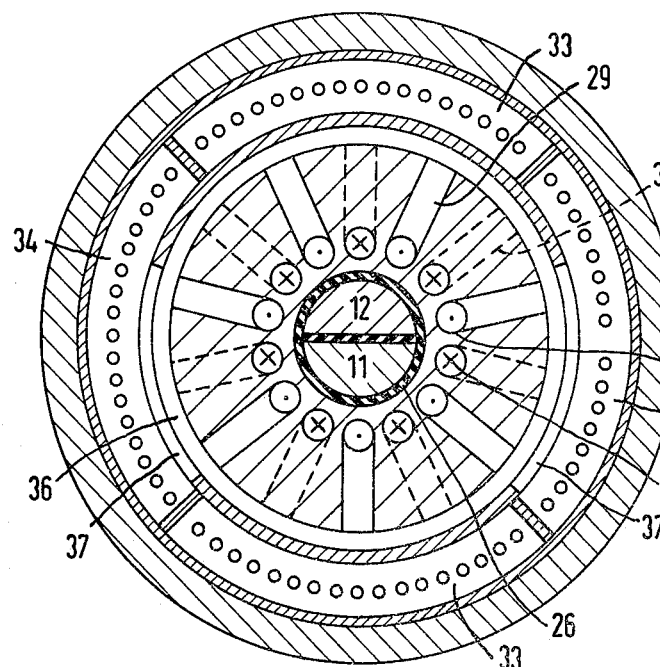
FIG. 3 is a cross-sectional view of FIG. 2 taken along the line III—III in the direction of the arrows.

Coolant supply and discharge channels 22 and 23 initially extend coaxially within the exciter shaft section 2, in a conventional manner, from a coolant connecting or junction head at the exciter-side of the shaft end. Both of the coolant channels 22 and 23 are subdivided into a multiplicity of axially parallel individual sub-channels 25, in accordance with the invention, in the vicinity of the axial current supply lines 9 and 10. The individual channels 25 surround, at a very slight radial spacing therefrom, an axial bore 26 for the excitation-current supply lines 9 and 10 in shaft section 2, on the one hand, and 11 and 12 in shaft section 1, on the other hand, as can be especially clearly seen in FIG. 3. Advantageously, a coolant supply channel 25a and a coolant discharge channel 25b are suitably disposed in alternating sequence peripherally about the axial bore 26. Due to this division of the coolant supply and discharge channels into a channel grid closely surrounding the excitation-current supply lines, an intense indirect cooling of the excitation-current supply lines is achieved with total thermal symmetry of the shaft. The lowest possible shaft temperature striven for to remove the excitation-current supply line losses is produced from the mixed temperature of the yet cold and of the heated coolant. The temperature jump between the shaft and the excitation-current supply lines is adequate for removing the waste or loss-produced heat through the supply line insulation 27 into the shaft.

Figure 2:
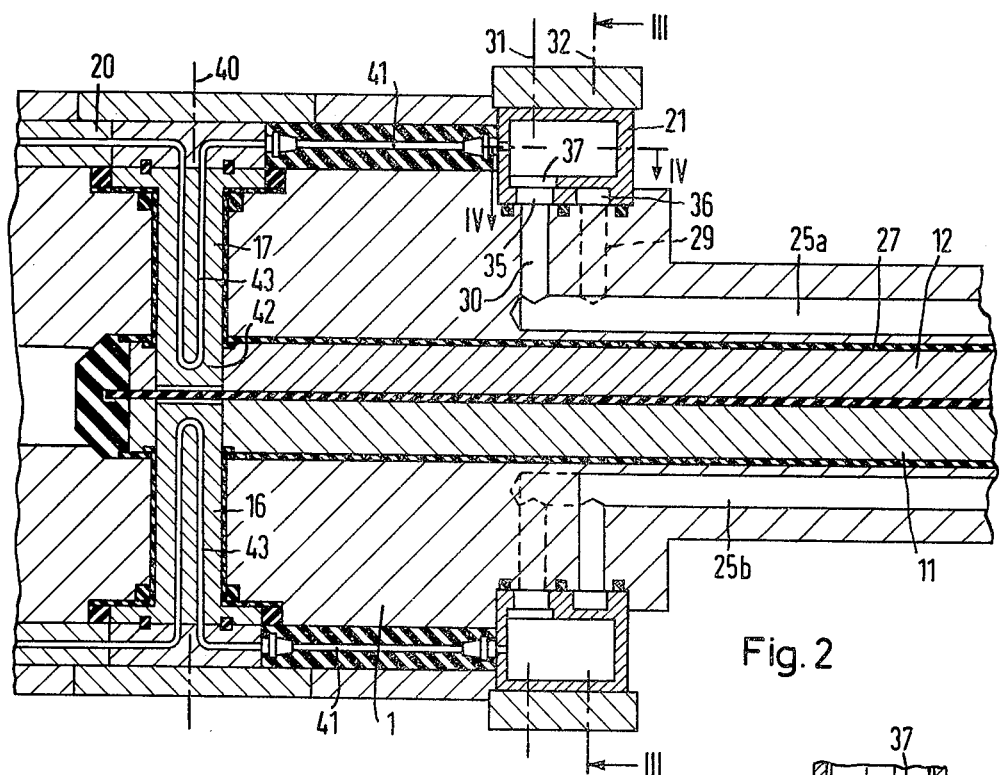
FIG. 2 is an enlarged fragmentary view of FIG. 1 in the region of the ends of the excitation-current supply lines that are located closer to the rotor.

The supply and discharge of the coolant at the water chamber 21 surrounding the shaft is effected through radial bores 29 and 30 formed in the shaft 2. Depending upon the number of the axial individual sub-channels 25, the radial bores 29 and 30 are disposed in two or more axially offset or staggered planes. In the embodiment of FIG. 2, there are provided only one plane 31 for the supply line bores 30 and one plane 32 for the discharge line bores 29.

Figure 4:
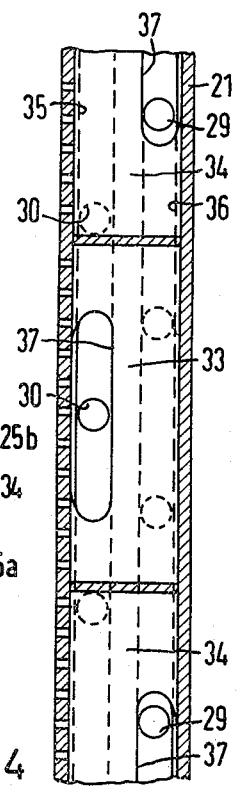
FIG. 4 is a fragmentary developed sectional view of the coolant collecting chamber forming part of the structure shown in FIG. 2.

To distribute the coolant to the individual windings of the excitation coil 18, the collecting chamber 21 is subdivided in a manner into two individual ring-segment shaped chambers 33 separated one from the other and surrounding the periphery of the shaft for forwardly conducting the coolant, and two corresponding individual chambers 34 for returning the coolant. Since the radial bores 30 and 29 for the coolant supply and discharge lines divide uniformly at the periphery into the associated planes 31 and 32, special measures are required for supplying the corresponding individual chambers 33 and 34 with coolants. A possible construction in accordance with the invention is that shown in FIGS. 2 and 4. Ring channels 35 and 36 are worked into the radially inner wall of the collecting chamber 21 in the respective radial bore planes 31 and 32. The supply line bores 30 terminate in the ring channel 35, and the discharge line bores 29 correspondingly terminate in the ring channel 36. Both of these ring channels 35 and 36 are connected through radial openings 37 to the respective supply and discharge line chambers 33 and 34. The foregoing embodiment of the invention affords a suitable distribution or division at the collecting chamber periphery at relatively low cost.

The number of ring channels 35 and 36 corresponds to the number of the radial bore planes 31 and 32 for the supply and discharge of the coolant. The number of radial bore planes in the rotor shaft section 1 and the exciter shaft section 2 is thus determined by the number of axial channels 25 and the number of radial bores 29, 30 permissible per plane 31, 32 for the shaft sturdiness and stability.

Whereas the excitation current supply lines 9 and 10 are surrounded up to the ends thereof in the exciter shaft section 2 by the coolant channels 25, the axial supply line ends are uncooled in the rotor shaft section 1, because the radial current contact bolts 16 and 17 are located in front or forward of the collecting chamber 21 in the axial plane 40. A short axial region thereby results between the planes 31 and 40, wherein no axial coolant channels 25 are provided. This uncooled zone is rendered safe by direct cooling of the radial bolts 16 and 17. The coolant required therefor is supplied through a high-pressure insulated base 41 from the collecting chamber 21 and travels into and out of the respective radial bolts 16 and 17. The coolant travel path in the contact bolts 16 and 17 is shown only schematically in FIG. 2, according to which the coolant is conducted into the bolts 16 and 17 through channels 43 to the radially inwardly disposed contact connection 42, is reversed thereat and radially again, though now outwardly, conducted to the current supply lines 20 installed at the shaft periphery from which it then flows directly into the exciter coil 18. Heat transfer from the excitation current lines 11 and 12 through the contact connection 42 into the intensely cooled radial contact bolts 16 and 16 prevents undue heating of the uncooled supply line zone between the planes 31 and 40.

A somewhat more simplified means for conducting the coolant is possible, however, wherein the respective channels for forwardly conducting the coolant and the channels for returning the coolant are so disposed that, respectively, several channels of the same type are located adjacent one another and surround, for example, a fourth of the periphery of the bore for the excitation-current supply lines. Thereby, a very great temperature difference is, in fact, produced in the shaft, which, however, at small temperature differences of heated and cold coolants is absolutely permissible.

With the aforedescribed construction of the coolant channels in accordance with the invention, a very reliable and adequate indirect cooling of the excitation-current supply lines in the shaft, is reliably assured in a relatively simple manner.

I claim:

1. Device for cooling excitation-current supply lines in a shaft connected at one end thereof to a liquid-cooled turbogeneration rotor having coil windings mounted thereon, the excitation-current supply lines being disposed in bifilar fashion within a bore formed along the axis of the shaft, comprising coolant supply and discharge channels for the coil windings extending in the shaft coaxially to the excitation supply lines and terminating in coolant collecting chambers at the rotor end of the shaft, coolant supply and discharge channels subdivided into a multiplicity of individual subchannels extending in the shaft at minimal spacing from the axial bore for the excitation-current supply lines, said subchannels terminating through radial bores with said coolant collecting chambers at the rotor end of the shaft.

2. Device according to claim 1 wherein said individual subchannels surround the axial bore so that, alternatingly, a subchannel for coolant supply and a subchannel for coolant discharge are disposed about the periphery of the axial bore.

3. Device according to claim 1 wherein a multiplicity of individual sub-channels serving, respectively, as supply and discharge channels are disposed adjacent one another at the periphery of the axial bore.

4. Device for cooling excitation-current supply lines in liquid cooled turbogenerator rotors which have the excitation-current supply lines disposed in a bifilar fashion in a bore of the shaft comprising coolant supply and discharge channels for the rotor windings running coaxially to the excitation-current supply lines with said channels terminating in coolant collecting chamber subdivided in four ring-segment shaped subchambers for coolant supply and discharge, said axial bore containing said excitation supply lines being surrounded by a multiplicity of coolant supply and discharge channels spaced a minimal distance from each other, said coolant supply channels surrounding said axial bore connected to radial bores leading to an annular channel disposed radially inwardly of said coolant collecting chamber and connected to said ring-segment shaped subchambers for coolant supply, and said coolant discharge channels surrounding said axial bore connected to other radial bores leading to another annular channel also disposed radially inwardly of said coolant collecting chamber and connected to said ring-segment shaped subchambers for coolant discharge.

5. Device according to claim 4 wherein said radial bores and said ring channels respectively connected thereto are disposed in axially offset planes, the radial bores in one of said planes being connected to subchannels serving to supply coolant, and the radial bores in the other of said planes being connected to subchannels serving discharge coolant.

6. Device according to claim 4 including radial current contact bolts threadedly secured in the excitation-current supply lines at the ends thereof located at the rotor end of the shaft, and high-pressure insulated hoses connecting said individual subchambers of said coolant collecting chamber with said current contact bolts for supplying coolant thereto.

7. Device according to claim 6 wherein said current contact bolts extend radially inwardly to a location at which a contact connection is formed with the excitation-current supply lines, said current contact bolts being formed with axial coolant supply and discharge bores extending radially to said inner contact connection location.

\* \* \* \* \*